United States Patent
Shivashankar et al.

(10) Patent No.: US 9,479,945 B2
(45) Date of Patent: Oct. 25, 2016

(54) DETERMINATION OF NETWORK PARAMETERS IN MOBILE COMMUNICATION NETWORKS

(71) Applicant: Telefonaktiebolaget L M Ericsson (publ), Stockholm (SE)

(72) Inventors: Subramanian Shivashankar, Chennai (IN); Rickard Cöster, Hägersten (SE); Vincent Huang, Sollentuna (SE); Mona Matti, Nacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/769,759

(22) PCT Filed: Feb. 25, 2013

(86) PCT No.: PCT/SE2013/050164
§ 371 (c)(1),
(2) Date: Aug. 21, 2015

(87) PCT Pub. No.: WO2014/129945
PCT Pub. Date: Aug. 28, 2014

(65) Prior Publication Data
US 2016/0014615 A1   Jan. 14, 2016

(51) Int. Cl.
*H04W 40/00* (2009.01)
*H04W 16/22* (2009.01)
(Continued)

(52) U.S. Cl.
CPC ............. *H04W 16/22* (2013.01); *H04W 16/18* (2013.01); *H04W 24/08* (2013.01); *H04W 28/18* (2013.01); *H04W 76/048* (2013.01); *H04W 88/02* (2013.01); *H04W 92/20* (2013.01)

(58) Field of Classification Search
CPC ... H04W 16/22; H04W 28/18; H04W 16/18; H04W 76/048; H04W 24/08; H04W 92/20; H04W 88/02
USPC ........................................................ 455/446
See application file for complete search history.

(56) References Cited

U.S. PATENT DOCUMENTS

2010/0029282 A1*  2/2010  Stamoulis ........... H04L 12/5695
                                                      455/436
2010/0232299 A1*  9/2010  Conway .............. H04L 41/0681
                                                      370/242

(Continued)

OTHER PUBLICATIONS

International Search Report and Written Opinion of the International Searching Authority, Application No. PCT/SE2013/050164, Oct. 28, 2013.

(Continued)

*Primary Examiner* — Tanmay Shah
(74) *Attorney, Agent, or Firm* — Myers Bigel & Sibley, P.A.

(57) ABSTRACT

Methods and apparatuses are disclosed that determine network parameters to be used by a wireless terminal. Network traffic history data is acquired. Each entry of the network traffic history data relates to network parameters of traffic flows between a network node and a wireless terminal. Which number of clusters to be used for representing the network traffic history data is determined by optimizing a generic utility function representing at least one network parameter of said network parameters of traffic flows. Each entry of the acquired network traffic history data is associated with one of the number of clusters by constrained clustering of the acquired network traffic history data. The constrained clustering uses a biased distance measure. Each cluster is associated with network parameters to be used by a wireless terminal based on the network traffic history data associated with each cluster.

18 Claims, 3 Drawing Sheets

(51) Int. Cl.
  *H04W 28/18* (2009.01)
  *H04W 16/18* (2009.01)
  *H04W 24/08* (2009.01)
  *H04W 76/04* (2009.01)
  *H04W 88/02* (2009.01)
  *H04W 92/20* (2009.01)

(56) References Cited

U.S. PATENT DOCUMENTS

2012/0120815 A1    5/2012   Anderson et al.
2013/0324112 A1*  12/2013   Jechoux ............... H04W 88/06
                                                      455/426.1

OTHER PUBLICATIONS

Ericsson et al., "Enhanced DRX MAC CE", Agenda Item: 6.10.2, Document for: Discussion, Decision; 3GPP TSG-RAN WG2 #81, Tdoc R2-130408, Malta, Jan. 28-Feb. 1, 2013, 2 pp.

Qualcomm Incorporated et al., "Proposal for UE Assistance Information", Agenda Item: 7.2.1; Document for: Discussion and decision, 3GPP TSG-RAN2 Meeting #78, R2-122831, Prague, Czech Republic, May 21, 25, 2012, 2 pp.

"Borda count" en.wikipedia.org/wiki/Borda_count (12 pages) (Jun. 17, 2013).

Ericsson et al. "Machine Learning for Adaptive DRX" (38 pages) (Jul. 6, 2012).

Han et al. "Data Mining Concepts and Techniques" *Third Edition* Section 10.1:Cluster Analysis (pp. 449-450) (2012).

"Kendall tau rank correlation coefficient" en.wikipedia.org/wiki/Kendall_Tau (6 pages) (Jun. 17, 2013).

Raj, P. Swapna "Utility Driven Clustering" *Proceedings of the Twenty-Fourth International Florida Artificial Intelligence Research Society Conference* (2011): pp. 479-480. Print.

Sui, Xin "Learning Distance Functions" *CS395T Visual Recognition and Search* (n.d.): n. pag. The University of Texas at Austin.

Stuart, Josh "Clustering and Cluster Evaluation" (52 pages) (Feb. 24, 2004).

"The CVX Users' Guide" *Release 2.1, CVX Research, Inc.* (99 pages) (Jun. 10, 2015).

Wagstaff et al. "Constrained K-means Clustering with Background Knowledge" *Proceedings of the Eighteenth International Conference on Machine Learning* p. 577-584 (2001).

\* cited by examiner

DETERMINATION OF NETWORK PARAMETERS IN MOBILE COMMUNICATION NETWORKS

CROSS REFERENCE TO RELATED APPLICATION

This application is a 35 U.S.C. §371 national stage application of PCT International Application No. PCT/SE2013/050164, filed on Feb. 25, 2013, the disclosure and content of which is incorporated by reference herein in its entirety. The above-referenced PCT International Application was published in the English language as International Publication No. WO 2014/129945 A1 on Aug. 28, 2014.

TECHNICAL FIELD

Embodiments presented herein relate to mobile communication networks, and particularly to determining network parameters to be used by a wireless terminal in a mobile communication network.

BACKGROUND

In mobile communication networks, there is always a challenge to obtain good performance and capacity for a given communications protocol, its parameters and the physical environment in which the mobile communication network is deployed.

In general terms, current generation mobile communication networks (such as cellular radio networks) operate in such a way that most data traffic between a wireless terminal (of the user) and a network node (of the mobile communication network) is given a best effort treatment. The data traffic is given the best effort treatment irrespective of the nature or characteristics of the data traffic. Some exceptions are certain specific data traffic types such as VoIP (voice over the Internet protocol), which are handled in an optimized way.

The next generation mobile communication networks may utilize the data traffic characteristics to optimize, or at least improve, the use of resources regardless of the data traffic type.

Mechanisms which may be used to optimize, or at least improve, the use of resources for a wireless terminal of a user, regardless of the data traffic type, include, but are not limited to:

(a) Provision of a monitoring service, for example based on user level broadband usage information, to dynamically allocate network resources for the wireless terminal in order to improve quality of service (QoS) and as well as efficient use of the resources, (b) Employment of mining history usage data in order to predict and/or recommend appropriate settings of network parameters for each wireless terminal and/or session, and/or (c) Prediction of cache to be allocated for a request, etc., for the wireless terminal. Such prediction may enable telecom operators to utilize network resources effectively so as to provide improved services for churners, influential users, etc.

The above mechanisms (a), (b) and (c) may be implemented by a prediction system. One type of commonly used prediction systems is clustering based prediction systems. The general principle of clustering based prediction systems comprises a first, offline, phase and a second, online, phase. In the first phase historical data is clustered and suitable parameters for each cluster are determined. For a new incoming instance, the parameters to be used for the incoming instance are in the second phase predicted by mapping the instance to a cluster and to associate the instance with the parameters of the cluster. Thus, in general terms, the first phase involves the following two steps:

(i) Determination of the number of clusters (hereinafter denoted K); and (ii) Clustering of the available data into the determined number of clusters.

In the data mining literature, so-called utility driven methods may be used to determine K and to perform clustering. However, the available methods typically use utility values from experts/oracles to determine K, and use user input (or background knowledge) for obtaining side information and/or constraints to be used during the clustering. Typical constraints include pairs of items that have to be associated with the same cluster and pairs that must be associated with different clusters.

Hence, there is still a need for an improved network parameter determination.

SUMMARY

An object of embodiments herein is to provide improved network parameter determination.

Determination of the number of clusters and the clustering procedure are commonly performed using intrinsic data mining properties only. The inventors of the enclosed embodiments have realized that available decision making models would not be optimized with respect to business decision making since the procedures are not optimized with respect to, for example, utilization of network resources or other utility parameters. For instance, the K-means algorithm is configured to find clusters based on maximizing inter-cluster distance and minimizing intra-cluster distance (the distance can be Euclidean distance). With respect to a prediction model configured to predict network parameters such as discontinuous transmission and/or reception (DTX/DRX) settings, two traffic flows which have different downlink usage at time t, but which possess similar battery saving and delay using the chosen DTX/DRX settings would be clustered into different clusters.

The inventors of the enclosed embodiments have therefore realized that in order to build an efficient clustering based prediction model, the step of determining the number of clusters and the step of clustering data into the clusters must be performed effectively.

A particular object is therefore to provide improved network parameter determination based on a clustering based prediction model.

According to a first aspect there is presented a method for determining network parameters to be used by a wireless terminal. The method is performed by a network node. The method comprises acquiring network traffic history data, each entry of which relating to network parameters of traffic flows between a network node and a wireless terminal. The method comprises determining which number of clusters to be used for representing the network traffic history data by optimizing a generic utility function representing at least one network parameter of said network parameters of traffic flows. The method comprises associating each entry of the acquired network traffic history data with one of said number of clusters by performing constrained clustering of the acquired network traffic history data, the constrained clustering using a biased distance measure. The method comprises associating each cluster with network parameters to be used by a wireless terminal based on the network traffic history data associated with each cluster Advantageously this provides an efficient clustering based prediction model. Advantageously the thus formed clustering based prediction model is directly related to the utility of the wireless terminal. Hence, the resulting network parameters to be used by the wireless terminal directly correspond to the utility of the wireless terminal and thus the disclosed clustering based prediction model enables a direct measure of quality.

According to a second aspect there is presented a network node for determining network parameters to be used by a wireless terminal. The network node comprises means arranged to acquire network traffic history data, each entry of which relating to network parameters of traffic flows between a network node and a wireless terminal. The network node comprises a processing unit arranged to determine which number of clusters to be used for representing the network traffic history data by optimizing a generic utility function representing at least one network parameter of said network parameters of traffic flows. The processing unit is further arranged to associate each entry of the acquired network traffic history data with one of said number of clusters by performing constrained clustering of the acquired network traffic history data, the constrained clustering using a biased distance measure. The processing unit is further arranged to associate each cluster with network parameters to be used by a wireless terminal based on the network traffic history data associated with each cluster.

According to a third aspect there is presented a computer program for determining network parameters to be used by a wireless terminal, the computer program comprising computer program code which, when run on a network node, causes the network node to perform a method according to the first aspect.

According to a fourth aspect there is presented a computer program product comprising a computer program according to the third aspect and a computer readable means on which the computer program is stored. The computer readable means may be non-volatile computer readable means.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The present disclosure is now described, by way of example, with reference to the accompanying drawings, in which.

DETAILED DESCRIPTION

The present disclosure will now be described more fully hereinafter with reference to the accompanying drawings, in which certain embodiments of the present disclosure are shown. The present disclosure may, however, be embodied in many different forms and should not be construed as limited to the embodiments set forth herein; rather, these embodiments are provided by way of example so that this disclosure will be thorough and complete, and will fully convey the scope of the disclosed concepts to those skilled in the art. Like numbers refer to like elements throughout the description.

Figure 1:
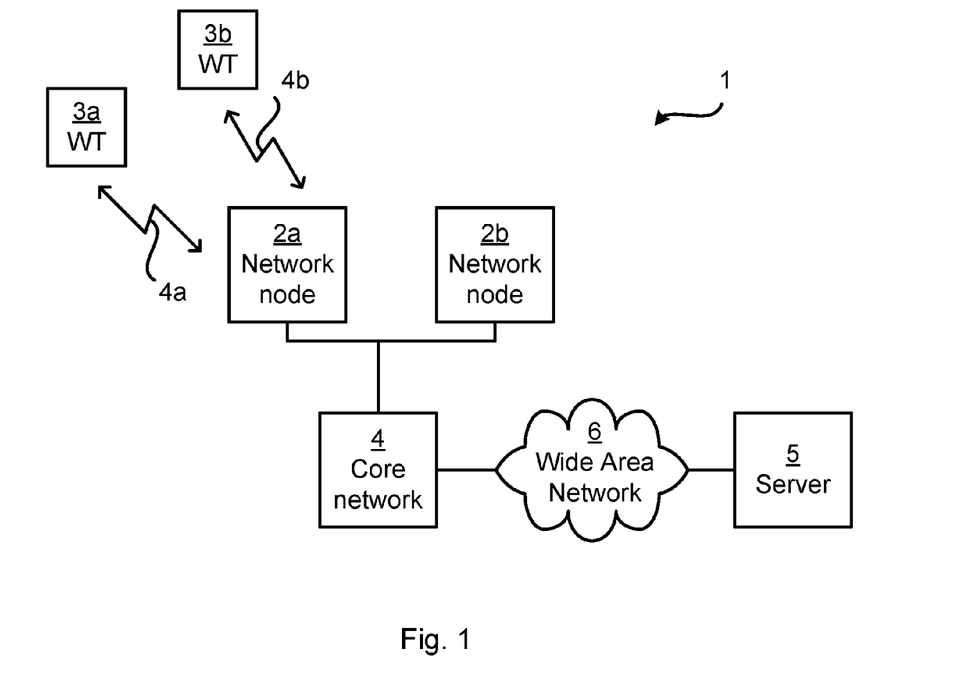
FIG. 1 is a schematic diagram illustrating a mobile communication network where embodiments presented herein may be applied.

FIG. 1 is a schematic diagram illustrating a mobile communication network 1 where embodiments presented herein can be applied. The mobile communications network 1 comprises at least one network node 2a, 2b. In general terms, the mobile communication network 1 may comprise a plurality of network nodes 2a, 2b.

The network nodes 2a, 2b are typically interconnected to each other via the so-called X2 interface.

The at least one network node 2a, 2b is arranged to function as a radio base station so as to provide network access in the form or radio connectivity to at least one wireless terminal (WT) 3a, 3b. The at least one network node 2a, 2b may be an evolved Node B (eNodeB or eNB), a Node B, a Base Transceiver Stations (BTS) or a Base Station Subsystem (BSS), etc. The at least one wireless terminal 3a, 3b may be a user equipment (UE), a smartphone, a mobile phone, a tablet computer, a machine-to-machine device, etc. with wireless connectivity or fixed mounted terminal capable of establishing a radio based communications channel with the at least one network node 2a, 2b. Each wireless terminal 3a, 3b may be associated with at least one particular end user. Uplink communication (from the wireless terminal 3a, 3b) and downlink communication (to the wireless terminal 3a, 3b) between each wireless terminal 3a, 3b and the network node 2a, 2b occur over a wireless radio interface 4a, 4b. The quality of the wireless radio interface 4a, 4b to each wireless terminal 3a, 3b can vary over time and depending on the position of the wireless terminal 3a, 3b, due to effects such as fading, multipath propagation, etc. The at least one network node 2a, 2b is operatively connected to a core network 4 for connectivity to central functions and a wide area network 6, such as the Internet. The at least one network node 2a, 2b typically connect to core network 4 via the so-called S1 interface. One or more content servers 5 may be operatively connected to the wide area network 5. In this way, the wireless terminal 3a, 3b is enabled to request content, such as video, audio, images, text, etc., from the one or more content servers 5. The content may be delivered in a content flow by streaming using a suitable protocol, e.g. HTTP (Hypertext transfer protocol) or RTP (Real-time Transport Protocol). Control from the wireless terminal 3a, 3b to the one or more content servers 5 may be transmitted using a suitable protocol, such as HTTP or RTSP (Real-Time Streaming Protocol). The mobile communication network 1 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), etc., as long as the principles described hereinafter are applicable.

In general terms, resources are allocated to the wireless terminal 3a, 3b upon establishing a connection to a network node 2a, 2b over the radio interface 4a, 4b. The allocated resources are determined by network parameters and thus influence the communications link between the wireless terminal 3a, 3b and the network node 2a, 2b. Data traffic characteristics may be utilized to optimize, or at least improve, the use of resources allocated to a wireless terminal 3a, 3b. Mechanisms for optimizing, or at least improving, the use of resources allocated to a wireless terminal 3a, 3b may be implemented by a prediction system. Determination of network parameters is based on a clustering based prediction model. Herein are disclosed mechanisms to determine the number of clusters in the clustering based prediction model by using a generic utility function. Herein are further disclosed a clustering process which is based on a biased distance measure. The biased distance measure can be used with any clustering process so as to maximize a given utility function. In order to provide improved network parameter determination based on such clustering based prediction models there is provided a network node, a method performed by the network node, a computer program comprising code, for example in the form of a computer program product, that when run on the network node, causes the network node to perform the method.

Figure 2:
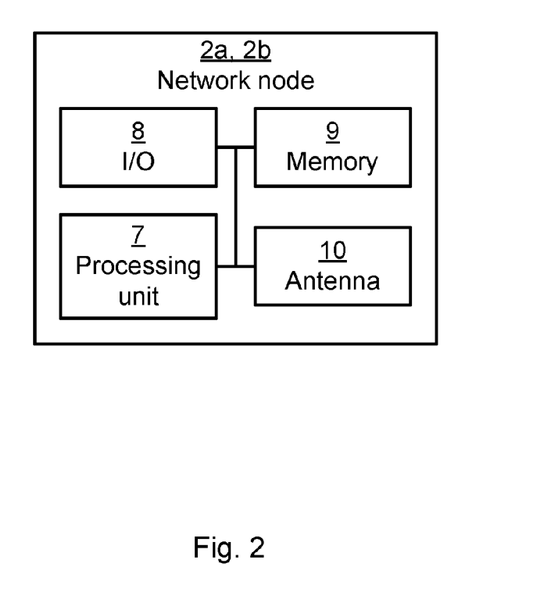
FIG. 2 is a schematic diagram showing functional modules of a network node.

FIG. 2 schematically illustrates, in terms of a number of functional modules, the components of a network node 2a, 2b. A processing unit 7 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 11 (as in FIG. 3), e.g. in the form of a memory 9. Thus the processing unit 7 is thereby arranged to execute methods as herein disclosed. The memory 9 may also comprise persistent storage, which, for example, can be any single one or combination of magnetic memory, optical memory, solid state memory or even remotely mounted memory. The network node 2a, 2b may further comprise an input/output (I/O) interface 8 for receiving and providing information to other network nodes 2a, 2b as well as a core network 4. The network node 2a, 2b also comprises one or more transmitters and receivers, the functionality of which are provided by a suitable number of antennae elements in an antenna 10 for radio communication with wireless terminals 3a, 3b. The processing unit 7 controls the general operation of the network node 2a, 2b e.g. by sending reports, signals, and data to the memory 9, the I/O interface 8, and the antenna 10 and receiving reports, signals, and data from the memory 9, the I/O interface 8, and the antenna 10. Other components, as well as the related functionality, of the network node 2a, 2b are omitted in order not to obscure the concepts presented herein. According to embodiments the network node 2a, 2b is an eNB, a BTS or a BSS.

Figure 3:
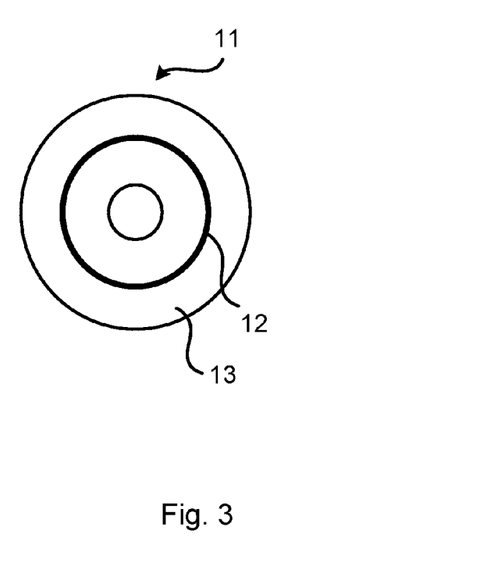
FIG. 3 shows one example of a computer program product comprising computer readable means.

FIG. 3 is flow chart illustrating embodiments of methods for determining network parameters to be used by a wireless terminal 3a, 3b. The methods are performed by the network node 2a, 2b. The methods are advantageously provided as computer programs 12. FIG. 3 shows one example of a computer program product 11 comprising computer readable means 13. On this computer readable means 13, a computer program 12 can be stored, which computer program 12 can cause the processing unit 7 and thereto operatively coupled entities and devices, such as the memory 9, the I/O interface 8, and the antenna 10 to execute methods according to embodiments described herein. In the example of FIG. 3, the computer program product 11 is illustrated as an optical disc, such as a CD (compact disc) or a DVD (digital versatile disc) or a Blu-Ray disc. The computer program product 11 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 12 is here schematically shown as a track on the depicted optical disk, the computer program 12 can be stored in any way which is suitable for the computer program product 11.

In general terms, the herein disclosed methods for determining network parameters to be used by a wireless terminal 3a, 3b are based on a utility driven decision making model. Models are built that directly fit the extrinsic decision making criterion. A generic utility function is disclosed to determine the number of clusters to use, side information/constraints are determined to perform constrained clustering by learning of a distance function.

The present disclosure is presented in a DTX/DRX prediction context and results are below given for prediction of DTX/DRX settings using real traffic data as network traffic history data. However, as the skilled person understands, the herein disclosed embodiments are equally applicable to other network parameters. For DTX/DRX setting prediction, the utility inter alia involves battery saving in the wireless terminal and transmission/reception delay, i.e. battery life of the wireless terminal 3a, 3b, DTX cycle length, and/or DRX cycle length. One scenario involves maximizing battery saving within a range of tolerable delay. Another scenario involves minimizing the delay whilst fixing the range of battery saving expected so as not to drain the battery of the wireless terminal. According to a further scenario there is provided a multi-objective optimization problem simultaneously to tune both battery saving and delay.

Figure 4:
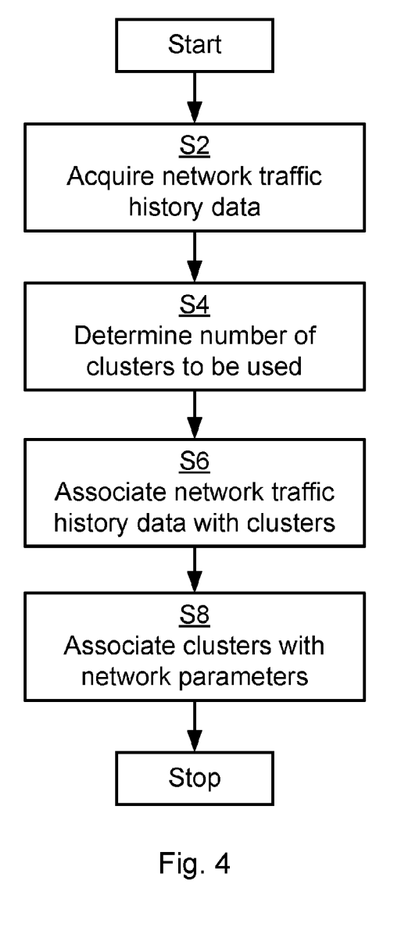
FIGS. 4 and 5 are flowcharts of methods according to embodiments.
Figure 5:
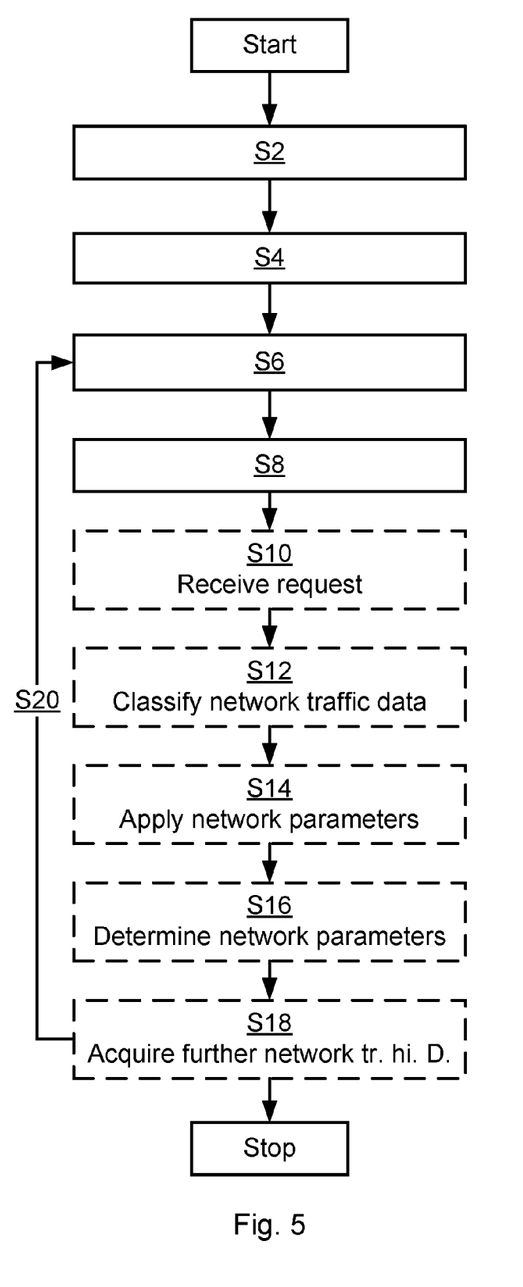

Methods for determining network parameters to be used by a wireless terminal 3a, 3b comprise, in a step S2, acquiring network traffic history data. The network traffic history data is acquired by a network node 2a, 2b. Each entry of the network traffic history data relates to network parameters of traffic flows between a network node 2a, 2b and a wireless terminal 3a, 3b.

The network traffic history data may be acquired from at least one network node 2a, 2b and/or at least one wireless terminal 3a, 3b. According to embodiments each network traffic history data entry relates to a predetermined amount of network traffic data between a wireless terminal 3a, 3b and a network node 2a, 2b. The predetermined amount may correspond to a predetermined duration of network traffic data. For example between 5 and 15 seconds of network traffic data, such as about 10 seconds of network traffic data, and/or a predetermined number of network traffic data packets.

(i) Determining the Number of Clusters

The network node $2a$, $2b$ is arranged to, in a step S4, determine which number of clusters to be used for representing the network traffic history data. Herein is disclosed a search based technique to determine the number K of clusters. The search based technique is based on a utility value obtained from a generic utility function, hereinafter denoted U. In contrast to state-of-the-art approaches the proposed generic utility function can be used to find the utility without relying on human input. Hence, the number of clusters is determined by optimizing a generic utility function representing at least one network parameter of the network parameters of traffic flows.

Let $N \geq 1$ be the number of network parameters used in the prediction model. Consider now network parameter i, where $1 \leq i \leq N$. Denote by $\theta_i$ the utility value for network parameter i. Denote by $0 \leq \pi_i \leq 1$ the probability for $\theta_i$. Denote by $\alpha_i$ a weight factor for $\theta_i$. The utility function U may then be written as:

$$\text{Utility}=U(\{\alpha_i\},\{\pi_i\},\{\theta_i\},K,1 \leq i \leq N).$$

According to embodiments U takes the following expression:

$$U(\alpha_i,\pi_i,\theta_i,K)=(\Sigma_i \alpha_i \cdot \pi_i \ln \theta_i)/f(K),$$

where $\Sigma i$ is the summations operator over the network parameters, where ln is the natural logarithm operator, and where $f(K)$ is a function of the number K of clusters. That is, the generic utility function may be written as a sum of biased expressions comprising the network parameters. The generic utility function may represent at least two biased network parameters of said network parameters of traffic flows. For $N=2$ the following expression is thus obtained:

$$U=(\alpha_1 \cdot \pi_1 \ln \theta_1 + \alpha_2 \cdot \pi_2 \ln \theta_2)/f(K).$$

According to an embodiment the parameters $\alpha_i$, $\pi_i$, $\theta_i$, for $1 \leq i \leq 2$ are defined as follows:

The parameter $\pi_1$ is the probability of occurrence for a first type of traffic flows that, by means of certain network parameter values being set for the communications link between the wireless terminal $3a$, $3b$ and the network node $2a$, $2b$, could result in higher battery savings for the wireless terminal $3a$, $3b$ than for default network parameter values.

According to embodiments the parameter $\theta_1$ is the average battery saving which could be obtained during the first type of traffic flows. However, as the skilled person understands, $\theta_1$ may represent other utility values of the network parameters as well.

The parameter $\pi_2$ is the probability of occurrence for a second type of traffic flows that, by means of certain network parameter values being set for the communications link between the wireless terminal $3a$, $3b$ and the network node $2a$, $2b$, could result in lower delay for the wireless terminal $3a$, $3b$ than for default network parameter values.

According to embodiments the parameter $\theta_2$ is the average delay gain which could be obtained during the second type of traffic flows. However, as the skilled person understands, $\theta_2$ may represent other utility values of the network parameters as well.

The values of the parameters $\theta_1$ and $\theta_2$ may be normalized between 0 and 1. Further, the delay gain $\theta_2$ may be range shifted such that for the highest delay $\theta_2=0$ and for the lowest delay $\theta_2=1$.

The parameters $\alpha_1$ and $\alpha_2$ are relative weights for battery saving and delay, respectively, that may be used to enable a convex combination of the respective utilities.

In general terms $f(K)=c_1+c_2 \cdot K^{c_3}$, where $c_1$, $c_2$ and $c_3$ are constants; $f(K)$ can thus be K, $K^2$, $1+2 \cdot K^2$, etc. The value of K may, for a given expression for U, be determined using any suitable search technique. Further, as the skilled person understands, the expression for U, as well as which network parameters to consider, generally depends on the object to be achieved. That is, the herein disclosed prediction system for optimizing, or at least improving, the use of resources allocated to a wireless terminal $3a$, $3b$ can be used for other optimizing, or at least improving, other network data as well.

For example, the herein disclosed prediction system may be used to cluster user call data. Assume that there are three clusters (i.e., that $K=3$), wherein a first cluster represents users for which the number of outgoing calls is less than the number of incoming calls (i.e., where Pr(incoming)>Pr(outgoing)), wherein a second cluster represents users for which the number of outgoing calls is equal to the number of incoming calls (i.e., where Pr(incoming)=Pr(outgoing)), and wherein a third cluster represents users for which the number of outgoing calls is larger than the number of incoming calls (i.e., where Pr(incoming)<Pr(outgoing)). According to the state-of-the-art the same data would instead be segmented into clusters based on usage; i.e., into clusters representing high, medium and low incoming and outgoing calls.

(ii) Distance Function

The network node $2a$, $2b$ is arranged to, in a step S6, associate each entry of the acquired network traffic history data with one of the number of clusters. A distance function is introduced in order to determine which entry of the network traffic history data to be associated with which cluster. More particularly, the association is accomplished by performing constrained clustering of the acquired network traffic history data. Without losing generality the distance function is described in a context where the network traffic history data is represented by network parameters. However, as the skilled person understands, the herein disclosed distance measure is also applicable for other types of network traffic history data. The distance d between two network parameters $\theta_j$ and $\theta_k$ is written as $$d_A(\theta_j,\theta_k)=\|\theta_j-\theta_k\|_A=\text{sqrt}((\theta_j-\theta_k)^T A (\theta_j-\theta_k)),$$

where T denotes the transpose operator and sqrt is the square root operator. The parameter A may be regarded as a weighting parameter. The term A may thus be used in order to introduce a non-linear bias in the determination of the distance between $\theta_j$ and $\theta_k$. The constrained clustering thus uses a biased distance measure. Hence, by introduction of A the distance measure $d_A(\theta_j, \theta_k)$ does not necessarily correspond to the Euclidean distance between $\theta_j$ and $\theta_k$.

In general term $A \geq 0$ is a positive semi-definite matrix in order to maintain the triangle inequality and to ensure a non-negative distance measure. Each entry in A may be regarded as a constraint/side-information. Typically the constraints/side-information is given as user input. Hence, the constrained clustering may be biased by user input. Additionally and/or alternatively at least one constraint of the constrained clustering may be based on the generic utility function. As a result thereof, pair of data-points that must (not) be grouped together may be properly labelled. Each determined cluster is then by the network node $2a$, $2b$, in a step S8, associated with network parameters to be used by a wireless terminal $3a$, $3b$ based on the network traffic history data associated with each cluster. The network node $2a$, $2b$ may further be arranged to, in a step S18, acquire further network traffic history data. At least one of the steps S6 and S8 may then be performed also on the further network traffic history data, in a step S20, without performing the step S4 of determining which number of clusters to be used.

As noted above the network parameters may relate to at least one of discontinuous transmission, DTX, settings and discontinuous reception, DRX, settings. Thus, according to embodiments the network parameters in each cluster are, in a step S16, determined so as to optimize the DTX settings and/or the DRX settings with respect to battery life of the wireless terminal 3a, 3b, DTX cycle length, DRX cycle length, DXT/DRX start offset, duration of long DXT/DRX Cycle, long DXT/DRX cycle timer, On duration, inactivity timer, duration of short DXT/DRX cycle, short DXT/DRX cycle timer, and retransmission timer, or any joint combination thereof.

The herein disclosed mechanisms may be used to build constraints/side-information for determining A in the distance function. Let L denote the number of network traffic history data flows considered. Denote by $F_l$ flow number 1, where $0 \leq l \leq L$. Assume that each network traffic history data flow is associated with a set of network parameters. As above, denote by N the total number network parameters. For example, according to the 3GPP standard there is a certain allowed combination of DTX/DRX settings that can be used. Each DTX/DRX setting may thus be represented by a unique identifier. Each flow $F_l$ may thus be represented by a 1×M vector, which captures the utility value obtained for the flow $F_l$ using M DRX settings.

The herein disclose distance measure is based inter alia on the understanding that if two network traffic history data flows have similar battery saving and delay (i.e. resulting in a similar value of the utility function U), then such two network traffic history data flows should be regarded as similar, despite being associated with, perhaps, different DTX/DRX settings. Such pairs of network traffic history data flows may be used to form constraints and/or side-information for determining A in the distance function learning procedure.

Determining constraints and/or side-information for determining A in the distance function learning procedure may involve the below sub-steps.

In a first sub-step the 1×M utility vector is determined for each flow

In a second sub-step the similarity of pairs of utility vectors are compared. The similarity may be determined as $1 - d_E(F_j, F_k)$, where $0 \leq d_E(F_j, F_k) \leq 1$ is the normalized Euclidean distance between flows $F_j$ and $F_k$. If the similarity between two flows is larger than a predetermined value $\Delta$, say $\Delta = 0.8$, then the pair is grouped into a first set S. The value of $\Delta$ may be obtained using a similar procedure as disclosed above to determine K. Correspondingly, if the similarity between two flows is not larger than the predetermined value the pair is grouped into a second set D.

In a third sub-step A may be determined from the following expressions:

$$\min_{A} \sum_{(\theta_i, \theta_j) \in S} \|\theta_i - \theta_j\|_A^2$$

$$\text{s.t.} \sum_{(\theta_i, \theta_j) \in S} \|\theta_i - \theta_j\|_A \geq 1,$$

$$A \succeq 0.$$

These expressions may be solved for A using existing convex programming tools. Hence, according to embodiments, convex optimization is used during the step S6 of associating each entry of the acquired network traffic history data with one of the number of sets. Further, the at least one of exhaustive search, line search, and simulated annealing may be used during the step S8 of associating each cluster with network parameters.

The thus determined network parameters may then be provided to a wireless terminal 3a, 3b. This may improve performance characteristics (such as improved battery life and/or reduced transmission/reception delay) of the wireless terminal 3a, 3b in comparison to if default network parameters are used. The network node 2a, 2b may, in a step S10, receive a request from a wireless terminal 3a, 3b where the request pertains to resources for a communications link 4a, 4b between the wireless terminal 3a, 3b and a network node 2a, 2b. The network node 2a, 2b may then, in a step S12, be arranged to classify current network traffic data of the wireless terminal 3a, 3b into one of the determined clusters. The classification in step S12 may be similar to the association in step S6. The network parameters associated with the determined cluster may then, in a step S14, be applied to the communications link 4a, 4b.

Figure 6:
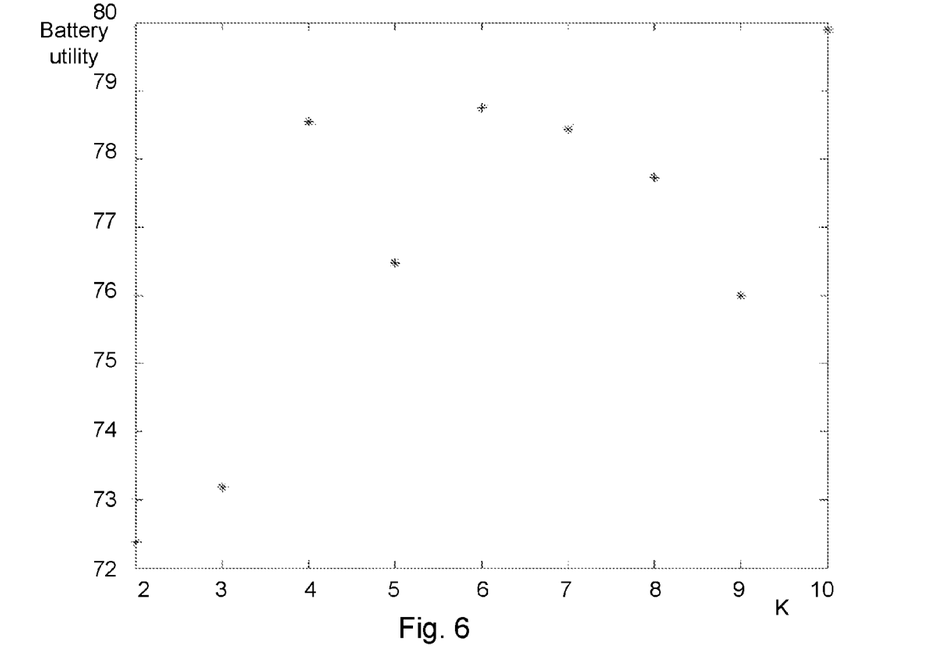
FIG. 6 schematically illustrates simulation results for battery saving utility as a function of K.
Figure 7:
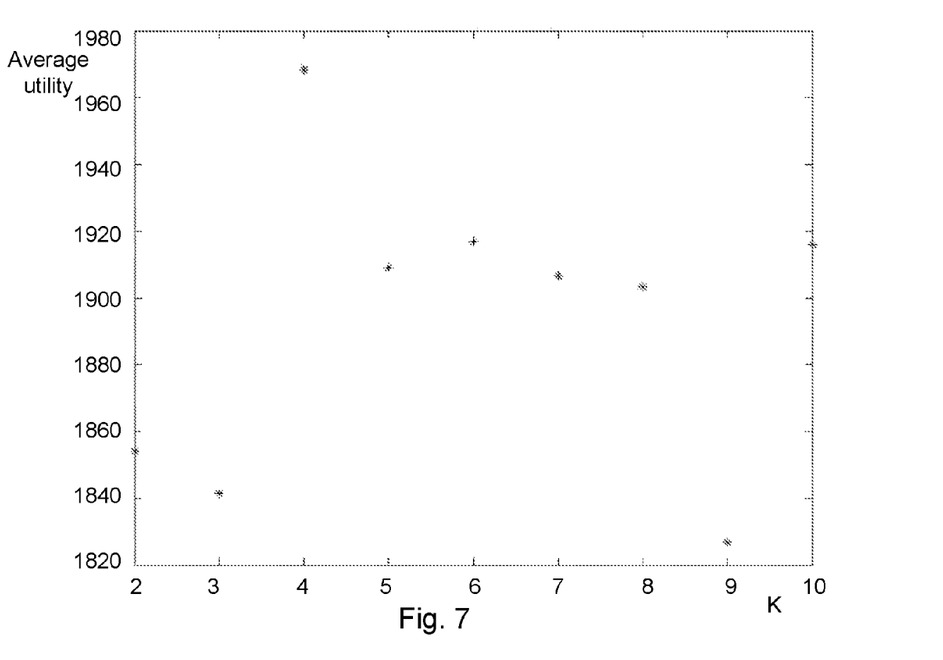
FIG. 7 schematically illustrates simulation results for battery saving and delay utility as a function of K.

Two non-limiting examples of scenarios where the enclosed embodiments may be applied will now be illustrated with references to FIGS. 6 and 7, respectively. In the examples the network traffic flows relates to transmission of streaming audio and video data. The examples do not involve training of the distance function. Instead an intrinsic distance measure (the Euclidean distance) is used and the effectiveness of the algorithm may be verified by observing the found clusters; as noted above, finding the number of clusters (K) and determining training of the distance function should be performed in combination.

Example 1

Battery Saving Utility as a Function of K

FIG. 6 illustrates battery utility as a function of K for a utility function U. U depends on the battery savings associated with each network traffic flow. Particularly, U is expressed as Utility $(K) = (\Sigma_i \text{Utility}(C_i))/K$, where $\Sigma_i$ is the summations operator over the index i and where Utility$(C_i) = (\Sigma_j \text{Battery Saving}(F_j))/|C_i|$, where $C_i$ represents cluster i, where $|C_i|$ represents the number of network traffic flows in cluster i, where $F_j$ represents network traffic flow j, and where $\Sigma_j$ is the summations operator over the index j. The utility is thus dependent on the clustering of the network traffic flows $F_j$ and thus ultimately on K. According to FIG. 6 the maximum utility is, for the network traffic flows under consideration, achieved for K=6.

Example 2

Battery Saving and Delay Utility as a Function of K

FIG. 7 illustrates an average of battery saving and delay utility (battery saving per delay unit) as a function of K for a utility function U. U depends on the battery savings associated with each network traffic flow and the delay associated with each network traffic flow. According to the present example battery savings and delay have the same weight factors. Particularly, U is expressed as Utility $(K) = (\Sigma_i \text{Utility}(C_i))/K$, where $\Sigma_i$ is the summations operator over the index i and where Utility($C_i$)=($\Sigma_j$ Battery Saving($F_j$)/Delay($F_j$))/|$C_i$|, where $C_i$ represents cluster i, where |$C_i$| represents the number of network traffic flows in cluster i, where $F_j$ represents network traffic flow j, and where $\Sigma_j$ is the summations operator over the index j. The utility is thus dependent on the clustering of the network traffic flows $F_j$ and thus ultimately on K. According to FIG. 7 the maximum utility is, for the network traffic flows under consideration, achieved for K=4.

The present disclosure has mainly been described above with reference to a few embodiments. However, as is readily appreciated by a person skilled in the art, other embodiments than the ones disclosed above are equally possible within the scope of the present disclosure, as defined by the appended patent claims.

The invention claimed is:

1. A method for determining network parameters to be used by a wireless terminal, the method being performed by a network node, the method comprising:
   acquiring network traffic history data, each entry of which relating to network parameters of traffic flows between a network node and a wireless terminal;
   determining a number of clusters to be used for representing the network traffic history data, wherein the clusters comprise grouped sets of the network traffic history data based on a generic utility function representing at least one network parameter of said network parameters of traffic flows;
   associating each entry of the acquired network traffic history data with one of said number of clusters by performing constrained clustering of the acquired network traffic history data, wherein the constrained clustering is constrained using a biased distance measure between the network parameters of traffic flows of the acquired network traffic history; and
   associating each cluster of the clusters with network parameters to be used by a wireless terminal based on the network traffic history data associated with each cluster of the clusters.

2. The method according to claim 1, further comprising:
   receiving a request from a wireless terminal, the request pertaining to resources for a communications link between the wireless terminal and a network node;
   classifying current network traffic data of the wireless terminal into one of the clusters; and
   applying to the communications link the network parameters associated with said one of the clusters.

3. The method according to claim 1, wherein the network parameters relate to discontinuous transmission, DTX, settings and/or discontinuous reception, DRX, settings.

4. The method according to claim 3, wherein the DTX settings and/or the DRX settings relate to at least one of battery life of the wireless terminal, DTX cycle length, and/or DRX cycle length.

5. The method according to claim 4, further comprising:
   determining the network parameters in each cluster based on the DTX settings and/or the DRX settings with respect to battery life of the wireless terminal, DTX cycle length, DRX cycle length, DXT/DRX start offset, duration of long DXT/DRX Cycle, long DXT/DRX cycle timer, On duration, inactivity timer, duration of short DXT/DRX cycle, short DXT/DRX cycle timer, and/or retransmission timer.

6. The method according to claim 1, wherein said each network traffic history data entry relates to a predetermined amount of network traffic data between a wireless terminal and a network node.

7. The method according to claim 1, wherein the generic utility function represents at least two biased network parameters of said network parameters of traffic flows.

8. The method according to claim 7, wherein the generic utility function is a sum of biased expressions comprising said at least two network parameters.

9. The method according to claim 7, wherein the generic utility function, U, is determined as:
   U=($\Sigma_i$ $\alpha_i \cdot \pi_i$ $\ln\theta_i$)/f(K), where $\theta_i$ is a utility value for network parameter i, where $0 \leq \pi_i \leq 1$ is a probability for $\theta_i$, where $\alpha_i$ is a weight factor for $\theta_i$, where $\Sigma_i$ is the summations operator over the at least two network parameters, and where f(K) is a function of the number of clusters, K.

10. The method according to claim 9, wherein f(K)=$c_1$+$c_2 \cdot K^{c_3}$, where $c_1$, $c_2$ and $c_3$ are constants.

11. The method according to claim 1, wherein at least one constraint of the constrained clustering is based on the generic utility function.

12. The method according to claim 1, wherein the constrained clustering is biased by user input.

13. The method according to claim 1, wherein convex optimization is used during the associating each entry of the acquired network traffic history data with one of said number of clusters.

14. The method according to claim 1, wherein at least one of exhaustive search, line search, and/or simulated annealing is used during the associating each cluster with network parameters.

15. The method according to claim 1, wherein the network traffic history data is acquired from at least one network node and/or at least one wireless terminal.

16. The method according to claim 1, further comprising:
   acquiring further network traffic history data; and
   performing at least one of the associating based also on said further network traffic history data without performing the determining.

17. A network node for determining network parameters to be used by a wireless terminal, the network node comprising:
   a receiving unit arranged to acquire network traffic history data, each entry of which relating to network parameters of traffic flows between a network node and a wireless terminal;
   a processing unit arranged to determine a number of clusters to be used for representing the network traffic history data, wherein the clusters comprise grouped sets of the network traffic history data based on a generic utility function representing at least one network parameter of said network parameters of traffic flows;
   the processing unit further being arranged to associate each entry of the acquired network traffic history data with one of said number of clusters by performing constrained clustering of the acquired network traffic history data, wherein the constrained clustering is constrained using a biased distance measure between the network parameters of traffic flows of the acquired network traffic history; and
   the processing unit further being arranged to associate each cluster of the clusters with network parameters to be used by a wireless terminal based on the network traffic history data associated with each cluster of the clusters.

18. A computer program product comprising a non-transitory computer-readable storage medium storing program code for determining network parameters to be used by a wireless terminal, the program code which, when run on a network node, causes the network node to:
  acquire network traffic history data, each entry of which relating to network parameters of traffic flows between a network node and a wireless terminal;
  determine a number of clusters to be used for representing the network traffic history data, wherein the clusters comprise grouped sets of the network traffic history data based on a generic utility function representing at least one network parameter of said network parameters of traffic flows;
  associate each entry of the acquired network traffic history data with one of said number of clusters by performing constrained clustering of the acquired network traffic history data, wherein the constrained clustering is constrained using a biased distance measure between the network parameters of traffic flows of the acquired network traffic history; and
  associate each cluster of the clusters with network parameters to be used by a wireless terminal based on the network traffic history data associated with each cluster of the clusters.

* * * * *